(12) United States Patent
Akechi et al.

(10) Patent No.: US 11,377,064 B2
(45) Date of Patent: Jul. 5, 2022

(54) COATED FABRIC FOR AIRBAG

(71) Applicant: Toyobo Co., Ltd., Osaka (JP)

(72) Inventors: Tsutomu Akechi, Otsu (JP); Takahiro Kuramoto, Osaka (JP)

(73) Assignee: TOYOBO CO., LTD., Osaka (JP)

( * ) Notice: Subject to any disclaimer, the term of this patent is extended or adjusted under 35 U.S.C. 154(b) by 682 days.

(21) Appl. No.: 14/914,101

(22) PCT Filed: Aug. 25, 2014

(86) PCT No.: PCT/JP2014/072115
§ 371 (c)(1),
(2) Date: Feb. 24, 2016

(87) PCT Pub. No.: WO2015/029933
PCT Pub. Date: Mar. 5, 2015

(65) Prior Publication Data
US 2016/0207492 A1     Jul. 21, 2016

(30) Foreign Application Priority Data
Aug. 26, 2013 (JP) .............................. JP2013-174823

(51) Int. Cl.
*B60R 21/235* (2006.01)
*D06N 3/00* (2006.01)
*D06N 3/12* (2006.01)

(52) U.S. Cl.
CPC ......... *B60R 21/235* (2013.01); *D06N 3/0006* (2013.01); *D06N 3/128* (2013.01);
(Continued)

(58) Field of Classification Search
CPC ........ B60R 21/235; B60R 2021/23514; D06N 3/0006; D06N 3/128; D06N 2211/268
(Continued)

(56) References Cited

U.S. PATENT DOCUMENTS 5,662,354 A * 9/1997 Ellerbrok ................. D03D 1/02
280/743.1
2012/0015573 A1   1/2012 Akechi et al.
(Continued)

FOREIGN PATENT DOCUMENTS

JP     2001-200447     7/2001
JP     2004-183152     7/2004
(Continued)

OTHER PUBLICATIONS

Machine translation of JP-2007169816.*
(Continued)

*Primary Examiner* — Vincent Tatesure
(74) *Attorney, Agent, or Firm* — Fish & Richardson P.C.

(57) ABSTRACT

The purpose of the present invention pertains to a coated fabric used for an automotive airbag, and more particularly, a coated fabric for an airbag most suitable for a rollover curtain airbag which is produced applying a sealing agent to a coated fabric and sewing the resulting fabric and which can keep the adhesion of the sealing agent to the coat resin even after long-term and high-temperature aging. The present coated fabric for an airbag is obtained by applying an addition-polymerizable solvent-free silicone resin onto at least one surface of a synthetic fiber textile, wherein a coating amount of the silicone resin is 15 to 45 $g/m^2$; and a weft strain/warp strain ratio as observed in stretching the coated fabric is 0.30 to 0.65.

16 Claims, 1 Drawing Sheet

(52) U.S. Cl.
CPC ............... *B60R 2021/23514* (2013.01); *D06N 2211/268* (2013.01)

(58) Field of Classification Search
USPC .......................................................... 442/59
See application file for complete search history.

(56) References Cited

U.S. PATENT DOCUMENTS

2015/0017859 A1    1/2015    Akechi et al.
2015/0336530 A1 *  11/2015    Tanaka .................... D03D 1/02
                                                    280/728.1

FOREIGN PATENT DOCUMENTS

| JP | 2007169816 A1 * | 12/2005 |
|---|---|---|
| JP | 2007-169816 | 7/2007 |
| JP | 2008-156798 | 7/2008 |
| JP | 2011-042898 | 3/2011 |
| JP | 2012-007289 | 1/2012 |
| WO | 2010/137282 | 12/2010 |
| WO | 2013/118755 | 8/2013 |

OTHER PUBLICATIONS

Japanese Patent Office, International Search Report for PCT/JP2014/072115 dated Nov. 11, 2014 (with English translation).
European Patent Office, Search Report in European Patent Application No. 14839740.9 (dated Mar. 22, 2017) (9 pages).
Indian Patent Office; Office Action mailed in counterpart Indian Patent Application No. 201647006605 (dated Oct. 22, 2019).

* cited by examiner

COATED FABRIC FOR AIRBAG

TECHNICAL FIELD

The present invention relates to a silicone resin coated fabric used for an automotive airbag, and more particularly, to a coated fabric which is most suitable for a rollover curtain airbag.

BACKGROUND ART

Automotive airbags are used for the purpose of protecting an occupant's body such as a face, head and the like in the event of a crash by actuating a sensor following an impact, generating a high-temperature and high-pressure gas, and instantaneously inflating an airbag with this gas. In recent years, automotive airbags have been widely used as one of safety devices and have been developed in their practical use not only for a driver seat and a passenger seat but also as knee airbags, side airbags, curtain airbags, etc., and automobiles including a plurality of airbags as standard equipment are increasing.

In association with increases of a site and quantity of an airbag to be installed, a request for further reduction in weight and size of an airbag system is increasing, and each part of the system has been designed for reducing weight and size of an airbag. In the context of this, a bag body of an air bag is studied for reduction of a bag volume or reduction of weight of the airbag by employing a coating-free base fabric, but in a side bag and a curtain air bag, which are located at a position close to a human body, use of a coated fabric is a main stream because a developing speed is required.

Moreover, installation of an airbag addressing rollover is increasing among curtain air bags. Characteristics of protecting a head of a passenger during rollover of a car body and maintaining an internal pressure for about 10 seconds after development of the airbag to avoid a person from bursting out of a car, are required of the roll over curtain air bag.

Conventionally, in order to achieve retention of an internal pressure for a long time, a base fabric has been investigated, in which the surface of a woven fabric by hollow weave which is densely-constituted using a weaving machine capable of hollow weaving is coated with 50 g/m$^2$ or less on one side surface, for example, 70 g/m$^2$ on both side surface of a silicone resin in Example (for example, see Patent Document 1).

In the case of a hollow woven base fabric, since the outside of the bag needs to be coated and a coating amount of a resin needs to be increased to maintain air-tightness, a mass of the entire bag is increased, and it is not preferred from the viewpoint of weight reduction. Further, when the coating amount is large, there is a problem that coated surfaces are brought into contact with each other to increase adhesion.

Then, as other means for achieving the retention of an internal pressure, a bag in which a coating amount of the base fabric is reduced by sewing two coated base fabrics with coated surfaces directed inward without using a hollow woven base fabric, is investigated. In this time, as a technology of preventing gas leakage from a woven portion, a method of applying a sealing agent to adhere to a coating resin along a sewing line in sewing two overlaid base fabrics and sewing these base fabrics, is utilized. In order to maintain the internal pressure, it is required that peeling at an interface between the woven fabric and the coating resin does not occur, and also peeling at an interface between the sealing agent and the coating resin does not occur in developing an airbag. It is preferred that there is not a failure of the sealing agent at the sealed sewn portion, but when the failure occurs, the sealing agent itself preferably cohesively fails.

Conventionally, a base fabric for an airbag in which flat yarns having an aspect ratio of 1.2 to 2.5 are used as a thread constituting a base fabric to reduce unevenness on the surface of a coated fabric, and adhesiveness between a sealing agent to be used in a sewing line and a coating resin is improved, is investigated (for example, see Patent Document 2). However, although the adhesiveness at the initial presents no problem, the adhesiveness after high-temperature aging where the sealing agent is cured and the cohesive failure of the sealing agent hardly occurs, is not described at all in terms of a base fabric characteristic. Also there is no description in other Documents.

PRIOR ART DOCUMENT

Patent Documents

Patent Document 1: JP-A-2011-042898
Patent Document 2: JP-A-2008-156798

SUMMARY OF THE INVENTION

Problems to be Solved by the Invention

It is an object of the present invention to provide a coated fabric used for an automotive airbag, and more particularly, a coated fabric for an airbag most suitable for a rollover curtain airbag which is produced applying a sealing agent to a coated fabric and sewing the resulting fabric and which can keep the adhesion of the sealing agent to the coat resin even after long-term and high-temperature aging.

Solutions to the Problems

The coated fabric for an airbag of the present invention capable of solving the above-mentioned problems consists of the following constitutions.

That is, the present invention is a coated fabric for an airbag obtained by applying an addition-polymerizable solvent-free silicone resin onto at least one surface of a synthetic fiber textile, wherein a coating amount of the silicone resin is 15 to 45 g/m$^2$; and a weft strain/warp strain ratio as observed in stretching the coated fabric is 0.30 to 0.65.

Furthermore, the present invention is the coated fabric for an airbag, wherein an average resin thickness of warp and weft at a vertex portion on the surface of the coated fabric is 4 μm or more.

Furthermore, the present invention is the coated fabric for an airbag, wherein a difference in the bending resistance between in warp direction and in weft direction of the coated fabric is 3 to 20 mm.

Furthermore, the preferred embodiment of the invention is a total fineness of a yarn constituting the textile is 200 to 550 dtex, and a cover factor of the textile is 1800 to 2500.

Effects of the Invention

Since the coated fabric for an airbag of the present invention keeps the adhesiveness between the coating agent and the sealing agent even after long-term and high-temperature aging, it can provide a base fabric most suitable for a rollover curtain airbag using a sealing agent at a sewing part.

MODE FOR CARRYING OUT THE INVENTION

The present invention will be described in detail below.
<Synthetic Fiber Textile>

In the present invention, the synthetic fiber textile means a textile that is woven using synthetic fiber thread. The textile is excellent in mechanical strength and has an advantage in that the thickness can be reduced. Examples of the structure of the textile include, but are not particularly limited, plain weave, twill weave, satin weave and variant weave thereof, multiaxial weave, and the like. Among them, plain weave, which is excellent in mechanical strength, is particularly preferred.

As materials used for the synthetic fiber, aliphatic polyamide fiber such as Nylon 66, Nylon 6, Nylon 46 or Nylon 12; aromatic polyamide fiber such as aramid fiber; and polyester fiber such as polyethylene terephthalate, polytrimethylene terephthalate or polybutylene terephthalate are particularly used.

Besides the above, all-aromatic polyester fiber, poly-p-phenylenebenzobisoxazole fiber (PBO fiber), ultrahigh molecular polyethylene fiber, polyphenylene sulfide fiber, polyether ketone fiber, or the like can be used. However, when the economic efficiency is taken into consideration, polyester fiber and polyamide fiber are preferred, and Nylon 66 is particularly preferred. In those fibers, a part of or all of them may be produced from recycled raw materials.

In these synthetic fibers, various kinds of additives may be contained for a purpose of improving the step passing property in the manufacturing step for starting yarn or the after-processing step. Examples of the additives include an antioxidant, thermostabilizer, smoothening agent, antistatic agent, thickener, and flame retardant. Further, the synthetic fiber may be a dope-dyed yarn or a yarn that is dyed after filature. Furthermore, the cross section of a single yarn may be any deformed cross section in addition to an ordinary round cross section.

The monofilament fineness of the synthetic fiber is preferably 1 to 8 dtex, and more preferably 3 to 7 dtex. When the fineness is 1 dtex or more, the strength of a textile can be maintained. On the other hand, when the fineness is 8 dtex or less, the rigidity can be kept low to maintain the package ability.

As a weaving machine in the weaving step, a water jet loom, an air jet loom, a rapier loom and the like can be employed. The water jet loom which can relatively easily perform a high speed weaving is preferably used in view of enhancing productivity.

A gray fabric after weaving may be subjected to refining or a dry finishing; however, the gray fabric is preferably passed through warm water before drying without performing thermosetting after drying. Since passing through warm water causes a thread to shrink and plays a role of filling voids of the textile, there is an effect of suppressing permeation of a resin into the textile in coating the textile with the resin, and it is possible to raise a resin film thickness to the surface of a base fabric. In this case, a temperature of warm water is preferably 80 to 95° C. and the gray fabric is preferably passed through the warm water for 20 seconds or more. When passing for less than 20 seconds, the effect of filling voids decreases.

An amount of oil solution adhering to a base fabric before coating the base fabric of the present invention is preferably less than 0.2% by weight. When the amount of oil solution adhering is 0.2% by weight or more, adhesiveness to the silicone resin is deteriorated. The amount is more preferably 0.1% by weight or less. Even if the amount of oil solution adhering to the base fabric is small, there is no problem, but it is preferably 0.01% by weight or more in consideration of a step passing property.
<Coated Fabric>

As a resin with which the textile is coated, silicone-based resins having heat resistance, cold resistance and flame retardance are preferred. Specific examples of the silicone-based resins include addition-polymerizable silicone resins or the like. Examples of the addition-polymerizable silicone resins include dimethyl silicone rubber, methylvinyl silicone rubber, methylphenyl silicone rubber, trimethyl silicone rubber, fluorosilicone rubber, methyl silicone resin, methylphenyl silicone resin, methylvinyl silicone resin, epoxy-modified silicone resin, acrylic modified silicone resin, polyester-modified silicone resin and the like. Among these, an addition-polymerizable methylvinyl silicone rubber which has rubber elasticity after curing, has excellent strength and stretching, and is advantageous in terms of cost, is preferable.

When the silicone resin is used, a reaction curing agent may be used, and for example, platinum-based compounds such as platinum powder, chloroplatinic acid, tetrachloroplatinic acid; palladium compounds, rhodium compounds, and organic peroxides such as benzoyl peroxide, p-chlorobenzoyl peroxide and o-chloro peroxide can be used.

In order to improve the adhesiveness between the silicone resin and the base fabric, an adhesion aid is preferably contained in the silicone resin. Examples of the adhesion aid include at least one selected from the group consisting of an amino-based silane coupling agent, an epoxy-modified silane coupling agent, a vinyl-based silane coupling agent, a chloro-based silane coupling agent and a mercapto-based silane coupling agent.

Inorganic fillers to be added to the silicone resin have been used as a filler aimed for reinforcement, viscosity adjustment, heat resistance improvement and flame retardance improvement of a silicone resin, and the most typical filler is silica particles. A specific surface area of the silica particle is preferably 50 $m^2/g$ or more, more preferably 50 to 400 $m^2/g$, and particularly preferably 100 to 300 $m^2/g$. When the specific surface area is in this range, it is easy to impart excellent tear strength characteristic to the resulting silicone cured product. The specific surface area is measured by a BET method. The silica particle may be used singly or may be used in combination of two types or more thereof. Examples of the silica particle capable of being used in the present invention include natural substances such as quartz, berg crystal, silica sand and diatomite; and synthetic substances such as dry silica, silica fume, wet silica, silica gel and colloidal silica.

In order to make it easy to impart better flowability to a resin composition including a silicone resin and an additive, the above-mentioned silica particle is preferably a hydrophobic silica particle in which hydrophobization treatment of the surface of the silica particle was performed using an organic silicon compound, for example, methylchlorosilanes such as trimethylchlorosilane, dimethyldichlorosilane or methyltrichlorosilane, or hexaorganodisilazanes such as dimethylpolysiloxane, hexamethyldisilazane, divinyltetramethyldisilazane or dimethyltetravinyldisilazane.

The content of the silica particles is preferably 10 to 20% by mass, and more preferably 12 to 20% by mass with respect to the entire silicone resin. When the content of the silica particles is less than 10% by mass, mechanical strength of the silicone rubber is liable to deteriorate. On the other hand, when the content of the silica particles is more than 20% by mass, since the flowability of the resin composition is easily reduced, workability of coating is deteriorated, and in addition to this, the resin becomes brittle and adhesiveness tends to deteriorate.

In the present invention, a resin viscosity of a silicone resin to be used is preferably 5000 to 40000 mPa·sec, more preferably 7000 to 25000 mPa·sec, and particularly preferably 8000 to 22000 mPa·sec. When the resin viscosity is less than 5000 mPa·sec, since the resin penetrates into a woven fabric and therefore an amount of the resin present on a resin surface of a base fabric is reduced, peeling at an interface between the coating agent and the sealing agent tends to occur in developing an airbag. On the other hand, when the resin viscosity is more than 40000 mPa·sec, it is difficult to adjust the coating amount to 45 g/m$^2$ or less. The silicone resin may be solvent-based or may be solvent-free as long as its viscosity can be adjusted to within the above-mentioned viscosity range; however, a solvent-free silicone resin is preferred in consideration of an impact on an environment.

In addition, in the present invention, when a resin composition containing an additive other than a resin is used, the viscosity of this resin composition is also defined as "viscosity of a resin".

Since the airbag is stored for a prolonged time in a car in an environment where temperature and humidity vary largely, particularly, characteristics of peeling after a long-term and high-temperature aging test becomes an extremely important required characteristics. The present invention found out to be important that the weft strain/warp strain ratio as observed in stretching the coated fabric is 0.30 to 0.65 in order to avoid the occurrence of peeling at an interface between the coating agent and the sealing agent in developing an airbag even after long-term and high-temperature aging. The weft strain/warp strain ratio in stretching is more preferably 0.35 to 0.60. When the weft strain/warp strain ratio is less than 0.30, a deformation amount in warp direction of the base fabric becomes large in developing an airbag, a joint point at an interface between the coating agent and the sealing agent slides, and peeling at an interface occurs. On the other hand, when the weft strain/warp strain ratio is more than 0.65, a deformation amount in weft direction of the base fabric becomes high in developing an airbag, a joint point at an interface between the coating agent and the sealing agent slides similarly, and peeling at an interface occurs. In both cases, the present inventors found out that a problem of occurrence of peeling at an interface arises in a state after long-term and high-temperature aging in which curing of the sealing agent has proceeded although the peeling does not occur in an evaluation at an initial stage of manufacture. The weft strain/warp strain ratio of the base fabric can be made proper by adjusting, in weaving or processing a base cloth, a crimp ratio balance between warp and weft through tension adjustment at the time of coating.

Adjustment of the weft strain/warp strain ratio of the base fabric can be performed at each of steps from weaving to coated fabric. Examples of a method of reducing a warp strain amount include a) a method of increasing a modulus of an original yarn to be used for warp, b) a method of increasing a tension in warp direction in weaving, c) a method of drying and thermosetting a fabric in a tense state in warp direction during drying after weaving, and d) a method of passing a fabric through a dry zone in a tense state in warp direction during coating. Preferred one among these methods is a method of drying and thermosetting a fabric in a tense state in warp direction during drying, or a method of passing a fabric through a dry zone in a tense state in warp direction during coating, and particularly preferred one is a method of passing a fabric through a dry zone in a tense state in warp direction during coating. This method is close to a final step of an airbag fabric, and it is not only easy to adjust to required physical properties, but also easy to adjust a resin amount in coating, and therefore the method is particularly preferred. When passing a fabric through a dry zone in a tense state in warp direction during coating, adjustment in warp and weft directions may be performed with a predetermined tensile force using a pin tenter to adjust the required weft strain/warp strain ratio of a base fabric. The strain amount in weft direction can be similarly adjusted with an original yarn to be used, a tensile force of weft in weaving, and a tensile force in drying and heat quantity.

Here, a measurement method of the weft strain/warp strain ratio will be described. A woven fabric is cut into a size of 300 mm in warp direction and 55 mm in weft direction, and warps are removed by nearly equal number from both ends and a direction of lateral thread is adjusted to 50 mm. Thereafter, a test piece is held at a chuck distance of 200 mm in a constant-speed loading type tensile tester, and a line is drawn in weft direction at a central portion of 100 mm. Thereafter, loads of 125 N, 250 N, 500 N, 1000 N and 2000 N are applied to pull the test piece and stop, respectively. Change amounts in warp direction and change amounts in weft direction of the central portion previously marked are read. The change amount in weft direction/the change amount in warp direction in each tensile strength is calculated, and absolute values of the calculated values are averaged to determine a weft strain/warp strain ratio. In addition, a sample is taken at five locations selected on a random basis to be measured.

In the coated fabric for an airbag of the present invention, it is important that an average resin thickness of warp and weft at a vertex portion on the surface of the coated fabric is 4 μm or more. The thickness is preferably 6 μm or more. In addition, the vertex portion refers to a part of a region formed by dividing a portion having a resin adhering thereto into three equal parts in a SEM cross section photograph at the time of using SEM and taking a photograph of a cut plane portion cut out along a line 2 or 3 in FIG. 1. When this portion is less than 4 μm, it is not preferred since there is a high possibility of the occurrence of peeling between the woven fabric and the coating agent in developing an airbag. An upper limit of the thickness is not particularly limited; however, when the thickness is 25 μm or more, it is not preferred since the problem that an adherence property of the surface of a coated fabric becomes high arises.

A coating amount of resin of the coated fabric for an airbag of the present invention is preferably 15 to 45 g/m$^2$, and more preferably 20 to 35 g/m$^2$. When the coating amount of resin is 15 g/m$^2$ or less, a required average resin thickness of warp and weft at a vertex portion on the surface of the coated fabric is not achieved since a thickness of a resin layer applied to the surface of a woven fabric is low. On the other hand, when the coating amount is 45 g/m² or more, adhesiveness between the coating agent and the sealing agent can be secured, this not only impairs the package ability of an airbag because flexibility of a coated woven fabric is deteriorated, but also a weight of the whole airbag becomes large.

The coated fabric for an airbag of the present invention preferably has a difference in the bending resistance in a 45° cantilever method between in warp direction and in weft direction of 3 to 20 mm. The difference in the bending resistance is more preferably 3 to 15 mm. When the difference in the bending resistance is 20 mm or more, a deformation amount in warp or weft direction of the base fabric becomes large in developing an airbag, an adhesion point at an interface between the coating agent and the sealing agent tend to slide, and peeling at an interface occurs. The difference in the bending resistance between in warp direction and in weft direction can be made proper by making a difference in a crimp ratio between warp and weft. When the difference in the bending resistance is smaller, it is better since the deformation amount in warp or weft direction of the base fabric in developing an airbag becomes smaller. However, the difference in the bending resistance between in warp direction and in weft direction is less than 3 mm, it is required to increase a tensile force in warp direction in weaving conditions or to reduce a speed of stitching weft, resulting in disadvantageous result in terms of base fabric quality or productivity. Particularly, with respect to the base fabric quality, it is not preferred since a problem that the adhesiveness between the woven fabric and the coating agent is deteriorated due to the occurrence of fuzz arises.

The coating base fabric of the present invention may be a both-sided coating base fabric in which both sides are coated; however, one side coating base fabric in which only one side is coated is preferred from the viewpoint of package ability.

In the present invention, as a method of applying a silicone resin, publicly known methods of providing coating are used. Examples of a coating method include knife coating, comma coating, the coating, gravure roll coating, kiss roll coating, spraying method, and dipping method.

A silicone resin composition is continuously applied onto a long textile base fabric by knife coating, it is preferred to control a tensile force of a base fabric in a traveling direction of the base fabric so as to be 400 to 1000 N/m, preferably 400 to 800 N/m. When the tensile force of the base fabric is less than 400 N/m, selvage of a base fabric textile is bulky and a large difference in the coating amount is produced between a central portion and an end portion of the base fabric, and variation of thickness in width direction becomes large. On the other hand, when the tensile force of the base fabric exceeds 1000 N/m, a crimp ratio balance between warp and weft balance is lost, and not only it becomes difficult to keep the coating amount in both of warp direction and weft direction in a specific range, but also it becomes difficult to keep the weft strain/warp strain ratio in stretching the base fabric in a specific range.

As a method of drying and curing the applied coating agent, heating methods commonly used such as hot air, infrared light, microwave and the like, are used, and a hot air irradiation method is widely used in terms of cost. A heating temperature and heating time present no problem as long as an applied silicone resin reaches a temperature adequate for curing; however, the heating temperature and the heating time are preferably 150 to 220° C. and 0.2 to 5 minutes, respectively.

The total fineness of a yarn constituting the textile is preferably 200 to 550 dtex. When the total fineness is more than 550 dtex, since the thickness of the base fabric increases to increase the rigidity of the base fabric, the package ability of airbag deteriorates. On the other hand, when the total fineness is less than 200 dtex, mechanical characteristics on the operation of airbag such as tensile strength and tear strength of the coated fabric are liable to be insufficient.

A cover factor constituting the textile is preferably 1800 to 2500, and more preferably 1900 to 2450. When the cover factor is less than 1800, physical characteristics required as an airbag (tensile strength and tear strength) tends to decrease. On the other hand, when the cover factor is more than 2500, a weaving property is difficult and the rigidity is increased, and therefore the package ability tends to deteriorate. In addition, the cover factor (CF) can be calculated by the following formula. In addition, a unit of the total fineness is "dtex", and a unit of the weaving density/is "number of thread/2.54 cm".

$$CF=(\text{warp total fineness of warp})^{1/2} \times \text{warp density} + (\text{total fineness of weft})^{1/2} \times \text{weft density}$$

Adhesiveness between the coating agent and the sealing agent in the present invention can be evaluated by initial peel strength and a cohesive failure rate, and peel strength and a cohesive failure rate after aging. With respect to a range showing a desired adhesiveness, the initial peel strength is preferably 45 N/cm or more, and more preferably 50 N/cm. In addition to this, the peel strength after aging is preferably 60 N/cm or more, and more preferably 63 N/cm. When the initial peel strength is less than 45 N/cm and the peel strength after aging is less than 60 N/cm, failure of the sealing agent occurs up to a sewing thread hole in developing an air bag to cause air permeability through the sewing thread hole, and therefore an internal pressure required for protecting occupants cannot be maintained. The cohesive failure rate is preferably 100% at the initial stage and at the stage after aging, and when the cohesive failure rate is less than 100%, this indicates that peeling occurs finally at an interface between the coating agent and the sealing agent.

The sealing agent used in the present invention is preferably a room temperature curing silicone of an addition type or of a predominantly addition type. There is thermally curing silicone of an addition type as silicone of an addition type. The thermally curing silicone requires a heating step although it has an advantage that a curing time is short, and therefore a room temperature curing type is preferred.

Moreover, as silicone in the sealing agent, silicone in which an initial elongation at break after curing is 800% or more, preferably 1000 to 1500% is preferably used. When extremely soft silicone is used, a joint portion has flexibility, and a volume at the time of folding can be small.

Further, it is preferred to have tensile strength of 1.0 MPa or more as a resin physical property of the sealing agent. In the sealing agent having tensile strength lower than this value, there is a possibility that by a pressure in developing an airbag, leakage of air permeation from a sewn portion occurs since the strength is too low although cohesive failure occurs. The tensile strength is preferably 1.5 MPa or more.

EXAMPLES

Below, by way of examples, the present invention will be more specifically described. However, the present invention is not limited by the following examples. Further all kinds' physical properties evaluation in the examples was performed with the following methods.

(1) Total Fineness

Total fineness was measured according to the method mentioned in JIS L-1095 9.4.1.

(2) Filament Numbers

Filament numbers were counted from the cross-sectional picture of a filament thread.

(3) Density of Textile

Density of the textile was measured according to the method mentioned in JIS L-1096 8.6.1.

(4) Coating Weight

The weight of the coated fabric was measured according to the method mentioned in JIS L-1096 8.4.2. Next, as a blank sample, the processing treatment was carried out without coating with the resin under the same condition at the coating, and then the weight of the resulting blank sample was measured according to the method mentioned in JIS L-1096 8.4.2. After that, the difference between the weight of the coated fabric and the weight of the blank sample was determined as the coating amount. Incidentally, the value was expressed in weight per 1 $m^2$ ($g/m^2$).

(5) Average Resin Thickness at Vertex Portion on Surface of Textile

Figure 1:
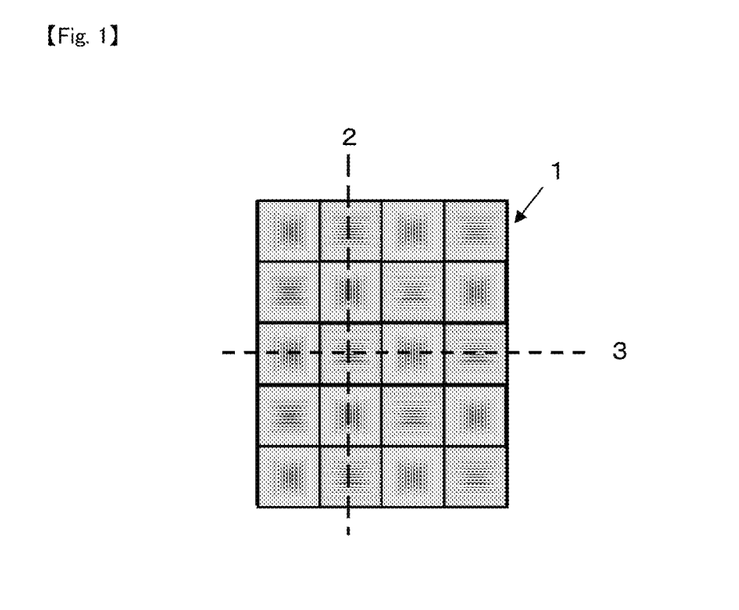
FIG. 1 is a schematic view of an SEM photograph of a surface of a coated fabric for an airbag of the present invention.

A coating base fabric was cut at a position of broken line portion indicated by 2 and 3 in FIG. 1 using a razor, a photograph of a cross section was taken in warp direction and in weft direction using SEM, and it was printed on paper. Then, based on this photograph of the cross section, a length of the cross section of a thread indicated by 4 in FIG. 2 was taken as 1, the length was divided into three equal parts, and a film thickness of the vertex portion (indicated by 5 in FIG. 2) was calculated. In addition, FIG. 2 is a schematic view of an SEM photograph at a cut face of weft which was cut along a line 2 in FIG. 1.

Figure 2:
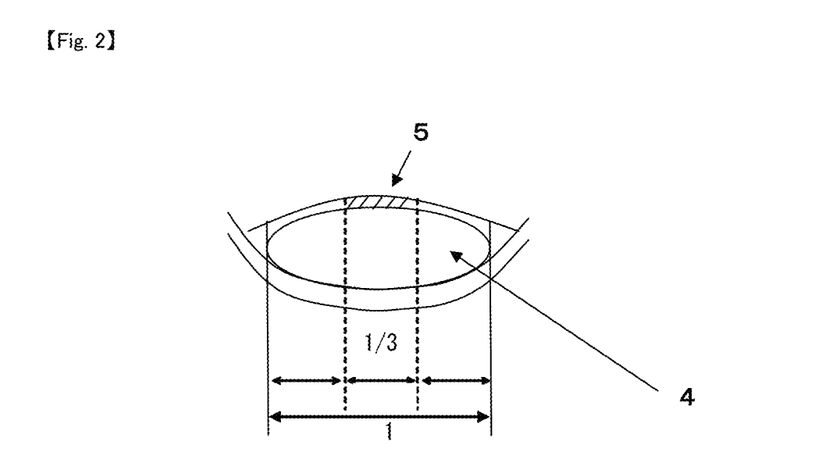
FIG. 2 is an illustrative view showing a position of a vertex portion (diagonally shaded area) on the textile surface in a cross-section at the time of cutting along broken lines in FIG. 1.

With respect to the average film thickness, a resin portion indicated by 5 in FIG. 2 was cut out from paper, and from a ratio of a mass of paper cut out to a mass of the entire paper, an average film thickness was calculated, and a value in warp direction and a value in weft direction were averaged to determine an average film thickness. The average film thickness was determined by rounding the first place of decimals.

(6) Weft Strain/Warp Strain Ratio

In measurement of the weft strain/warp strain ratio, a woven fabric is cut into a size of 300 mm in warp direction and 55 mm in weft direction, and warps are removed and a direction of lateral thread is adjusted to 50 mm. Thereafter, a test piece is held at a chuck distance of 200 mm in a constant-speed loading type tensile tester, and a line is drawn in weft direction at a central portion of 100 mm in length. Thereafter, loads of 125 N, 250 N, 500 N, 1000 N and 2000 N are applied to pull the test piece and stop, respectively. Change amounts in warp direction and change amounts in weft direction of the central portion previously marked are read. The change amount in weft direction/the change amount in warp direction in each tensile strength is calculated, and absolute values of the calculated values are averaged to determine a weft strain/warp strain ratio. In addition, a sample is taken at five locations selected on a random basis to be measured.

(7) Bending Resistance

A bending resistance was measured by a method according to JIS L 1096: 1999 8.19. 1 A method (45° cantilever method).

(8) Initial Peel Strength and Cohesive Failure Rate

Two coated fabrics of 60 mm wide were bonded to each other with a room temperature curing silicone adhesive of addition curing type, having tensile strength of 3.0 MPa and tensile elongation of 1300% as resin physical properties, which was applied so as to be 1 mm in thickness, and left standing for 24 hours in an environment of 23° C. and 65% RH to harden the adhesive. Then, the coated fabric bonded with two coated bonded fabrics was cut to prepare a piece of 50 mm wide, and a T-type peel test of this piece was conducted at a chuck distance of 60 mm and at a tensile speed of 500 mm/min. A peak strength measured in this time was taken as peel strength (N/cm), and the adhesiveness between the coating agent and the sealing agent was represented by a ratio (%) of cohesive failure at an adhesion interface. In addition, a cohesive failure rate was calculated as follows. A portion where the silicone adhesive layer was present in a thickness of 0.2 mm or more on the sample after the peel test was considered as cohesive failure. The cohesive failure rate was calculated from an area of cohesive failure and an area of the sample subjected to the T-type peel test. Four measurements were averaged to determine a cohesive failure rate.

(9) Peel Strength and Cohesive Failure Rate after Aging

Two coated fabrics of 60 mm wide were bonded to each other with a room temperature curing silicone adhesive of addition curing type, having tensile strength of 3.0 MPa and tensile elongation of 1300% as resin physical properties, which was applied so as to be 1 mm in thickness, and then left standing for 24 hours in an environment of 23° C. and 65% RH, and placed in an oven set at 110° C. and left standing for 1000 hours. Then, the coated fabric bonded with two coated bonded fabrics was cut to prepare a piece of 50 mm wide, and a T-type peel test of this piece was conducted at a chuck distance of 60 mm and at a tensile speed of 500 mm/min. A peak strength measured in this time was taken as peel strength (N/cm), and the adhesiveness between the coating agent and the sealing agent was represented by a ratio (%) of cohesive failure at an adhesion interface. In addition, a cohesive failure rate was calculated as follows. A portion where the silicone adhesive layer was present in a thickness of 0.2 mm or more on the sample after the peel test was considered as cohesive failure. The cohesive failure rate was calculated from an area of cohesive failure and an area of the sample subjected to the T-type peel test. Four measurements were averaged to determine a cohesive failure rate.

Example 1

Polyamide 66 multi-filament yarn including 140 filaments in which the total fineness was 470 dtex was woven by plain weave in a water jet loom, and then the resulting product was subjected to a shrinkage processing using boiling water and a dry finishing at 130° C. In the resulting textile, the density of cloth in warp direction was 46 threads/2.54 cm, the density of cloth in weft direction was 46 threads/2.54 cm, and the cover factor was 1,994.

Next, an addition-polymerizable vinylmethyl silicone resin having a resin viscosity of 10000 mPa·sec was applied onto one side of the above textile with a floating knife coating. Then, the resin was cured at 200° C. for 1 minute to obtain a coated base fabric with a coating amount of 35 $g/m^2$. An average resin thickness of warp and weft at a vertex portion on the textile surface of the obtained coated fabric was 11.3 μm, the weft strain/warp strain ratio was 0.57, and the bending resistance in warp and weft directions were 59 mm and 67 mm, respectively. The characteristics of this coated fabric were evaluated and the results are shown in Table 1. The obtained coated fabric exhibited 100% cohesive failure of the sealing agent at the initial and after aging, and was excellent in adhesiveness between the coating agent and the sealing agent.

Example 2

A coated fabric for an airbag was prepared in the same manner as in Example 1 except for adjusting the coating amount of the resin after drying to 20 g/m², and the weft strain/warp strain ratio as a base fabric physical property was varied to 0.48. In this time, an average resin thickness of warp and weft at a vertex portion on the textile surface of the obtained coated fabric was 7.3 µm, and the bending resistance in warp and weft directions were 64 mm and 72 mm, respectively. The characteristics of this coated fabric were evaluated and the results are shown in Table 1. The obtained coated fabric exhibited 100% cohesive failure of the sealing agent at the initial and after aging, and was excellent in adhesiveness between the coating agent and the sealing agent.

Example 3

A coated fabric for an airbag was prepared in the same manner as in Example 1 except for using polyamide 66 multi-filament yarn including 72 filaments in which the total fineness was 470 dtex and adjusting the coating amount of the resin after drying to 26 g/m², and the weft strain/warp strain ratio as a base fabric physical property was varied to 0.52. In this time, an average resin thickness of warp and weft at a vertex portion on the textile surface of the obtained coated fabric was 7.1 µm, and the bending resistance in warp and weft directions were 67 mm and 76 mm, respectively. The characteristics of this coated fabric were evaluated and the results are shown in Table 1. The obtained coated fabric exhibited 100% cohesive failure of the sealing agent at the initial and after aging, and was excellent in adhesiveness between the coating agent and the sealing agent.

Example 4

Polyamide 66 multi-filament yarn including 144 filaments in which the total fineness was 470 dtex was woven by plain weave in a water jet loom, and then the resulting product was subjected to a shrinkage processing using boiling water and a dry finishing at 130° C. In the resulting textile, the weaving density in warp direction was 51 threads/2.54 cm, the density of cloth in weft direction was 51 threads/2.54 cm, and the cover factor was 2,211. Thereafter, a coated fabric for an airbag was prepared in the same manner as in Example 1 except for adjusting the coating amount of the resin after drying to 25 g/m², and the weft strain/warp strain ratio as a base fabric physical property was varied to 0.42. In this time, an average resin thickness of warp and weft at a vertex portion on the textile surface of the obtained coated fabric was 8.4 µm, and the bending resistance in warp and weft directions were 69 mm and 79 mm, respectively. The characteristics of this coated fabric were evaluated and the results are shown in Table 1. The obtained coated fabric exhibited 100% cohesive failure of the sealing agent at the initial and after aging, and was excellent in adhesiveness between the coating agent and the sealing agent.

Example 5

Polyamide 66 multi-filament yarn including 108 filaments in which the total fineness was 350 dtex was woven by plain weave in a water jet loom, and then the resulting product was subjected to a shrinkage processing using boiling water and a dry finishing at 130° C. In the resulting textile, the weaving density in warp direction was 55 threads/2.54 cm, the density of cloth in weft direction was 55 threads/2.54 cm, and the cover factor was 2,058. Thereafter, a coated fabric for an airbag was prepared in the same manner as in Example 1 except for adjusting the coating amount of the resin after drying to 36 g/m², and the weft strain/warp strain ratio as a base fabric physical property was varied to 0.60. In this time, an average resin thickness of warp and weft at a vertex portion on the textile surface of the obtained coated fabric was 10.8 µm, and the bending resistance in warp and weft directions were 70 mm and 75 mm, respectively. The characteristics of this coated fabric were evaluated and the results are shown in Table 1. The obtained coated fabric exhibited 100% cohesive failure of the sealing agent at the initial and after aging, and was excellent in adhesiveness between the coating agent and the sealing agent.

Example 6

Polyamide 66 multi-filament yarn including 84 filaments in which the total fineness was 270 dtex was woven by plain weave in a water jet loom, and then the resulting product was subjected to a shrinkage processing using boiling water and a dry finishing at 130° C. In the resulting textile, the weaving density in warp direction was 69 threads/2.54 cm, the density of cloth in weft direction was 69 threads/2.54 cm, and the cover factor was 2,268. Thereafter, a coated fabric for an airbag was prepared in the same manner as in Example 1 except for adjusting the coating amount of the resin after drying to 25 g/m², and the weft strain/warp strain ratio as a base fabric physical property was varied to 0.37. In this time, an average resin thickness of warp and weft at a vertex portion on the textile surface of the obtained coated fabric was 10.4 µm, and the bending resistance in warp and weft directions were 66 mm and 78 mm, respectively. The characteristics of this coated fabric were evaluated and the results are shown in Table 1. The obtained coated fabric exhibited 100% cohesive failure of the sealing agent at the initial and after aging, and was excellent in adhesiveness between the coating agent and the sealing agent.

Example 7

Polyamide 66 multi-filament yarn including 72 filaments in which the total fineness was 235 dtex was woven by plain weave in a water jet loom, and then the resulting product was subjected to a shrinkage processing using boiling water and a dry finishing at 130° C. In the resulting textile, the weaving density in warp direction was 73 threads/2.54 cm, the density of cloth in weft direction was 73 threads/2.54 cm, and the cover factor was 2,238. Thereafter, a coated fabric for an airbag was prepared in the same manner as in Example 1 except for adjusting the coating amount of the resin after drying to 24 g/m², and the weft strain/warp strain ratio as a base fabric physical property was varied to 0.44. In this time, an average resin thickness of warp and weft at a vertex portion on the textile surface of the obtained coated fabric was 8.9 µm, and the bending resistance in warp and weft directions were 66 mm and 81 mm, respectively. The characteristics of this coated fabric were evaluated and the results are shown in Table 1. The obtained coated fabric exhibited 100% cohesive failure of the sealing agent at the initial and after aging, and was excellent in adhesiveness between the coating agent and the sealing agent.

Comparative Example 1

A coated fabric for an airbag was prepared in the same manner as in Example 1 except for adjusting the coating amount of the resin after drying to 14 g/m², and an average resin thickness of warp and weft at a vertex portion on the textile surface of the coated fabric was varied to 3.8 μm. In this time, the weft strain/warp strain ratio of the obtained coated fabric was 0.66, and the bending resistance in warp and weft directions were 68 mm and 74 mm, respectively. The characteristics of this coated fabric were evaluated and the results are shown in Table 1. The obtained coated fabric exhibited 100% cohesive failure of the sealing agent at the initial, but did not exhibit 100% cohesive failure after aging. The reason for this is that peeling occurred between the coating agent and the sealing agent before the sealing agent was cohesively failed.

Comparative Example 2

A coated fabric for an airbag was prepared in the same manner as in Example 1 except that in Example 3, after weaving polyamide 66 multi-filament yarn in a water jet loom, subjecting the resulting product to a dry finishing at 130° C., and thereafter, the product was subjected to thermosetting at 180° C. while stretching the product by 0% in warp direction and by 1% in a crosswise direction and that the coating amount of the resin after drying was adjusted to 21 g/m², and the weft strain/warp strain ratio as a base fabric physical property was varied to 0.28. In this time, an average resin thickness of warp and weft at a vertex portion on the textile surface of the obtained coated fabric was 5.2 μm, and the bending resistance in warp and weft directions were 64 mm and 79 mm, respectively. The characteristics of this coated fabric were evaluated and the results are shown in Table 1. The obtained coated fabric did not exhibit 100% cohesive failure of the sealing agent at the initial and after aging, and was extremely low in adhesiveness between the coating agent and the sealing agent. The reason for this is that a deformation amount in warp direction of the base fabric became large in a peeling test and a joint point at an interface between the coating agent and the sealing agent slid.

Comparative Example 3

A coated fabric for an airbag was prepared in the same manner as in Example 1 except for adjusting the coating amount of the resin after drying to 33 g/m² in Example 5, and the weft strain/warp strain ratio as a base fabric physical property was varied to 0.68. In this time, an average resin thickness of warp and weft at a vertex portion on the textile surface of the obtained coated fabric was 10.6 μm, and the bending resistance in warp and weft directions were 71 mm and 76 mm, respectively. The characteristics of this coated fabric were evaluated and the results are shown in Table 1. The obtained coated fabric exhibited 100% cohesive failure of the sealing agent at the initial, but did not exhibit 100% cohesive failure after aging, and was low in adhesiveness between the coating agent and the sealing agent. The reason for this is that a deformation amount in weft direction of the base fabric became large in a peeling test and a joint point at an interface between the coating agent and the sealing agent slid.

Example 8

A coated fabric for an airbag was prepared in the same manner as in Example 1 except that in Example 1, after weaving polyamide 66 multi-filament yarn in a water jet loom, subjecting the resulting product to a dry finishing at 130° C., and thereafter, the product was subjected to thermosetting at 180° C. while stretching the product by 0% in warp direction and by 1.5% in a crosswise direction and that the coating amount of the resin after drying was adjusted to 25 g/m², and the bending resistance in warp and weft directions as a base fabric physical property were varied to 62 mm and 84 mm, respectively. In this time, an average resin thickness of warp and weft at a vertex portion on the textile surface of the obtained coated fabric was 8.4 μm, and the weft strain/warp strain ratio was 0.42. The characteristics of this coated fabric were evaluated and the results are shown in Table 1. The obtained coated fabric exhibited 100% cohesive failure of the sealing agent at the initial. The obtained coated fabric did not exhibit 100% cohesive failure after aging. The reason for this is that since a difference in the bending resistance between in warp direction and in weft direction was large, a deformation amount in warp direction of the base fabric became large in a peeling test and a joint point at an interface between the coating agent and the sealing agent slid.

TABLE 1

| | | Example 1 | Example 2 | Example 3 | Example 4 | Example 5 | Example 6 | Example 7 | Comparative Example 1 | Comparative Example 2 | Comparative Example 3 | Example 8 |
|---|---|---|---|---|---|---|---|---|---|---|---|---|
| Total fineness | dtex | 470 | 470 | 470 | 470 | 350 | 270 | 235 | 470 | 470 | 350 | 470 |
| Filament numbers | thread | 140 | 140 | 72 | 144 | 108 | 84 | 72 | 140 | 72 | 108 | 140 |
| Density of textile (warp/weft) | thread/ 2.54 cm | 46/46 | 46/46 | 46/46 | 51/51 | 55/55 | 69/69 | 73/73 | 46/46 | 46/46 | 55/55 | 46/46 |
| Cover factor | — | 1,994 | 1,994 | 1,994 | 2,211 | 2,058 | 2,268 | 2,238 | 1,994 | 1,994 | 2,058 | 1,994 |
| Coating weight | g/m² | 35 | 20 | 26 | 25 | 36 | 25 | 24 | 14 | 21 | 33 | 25 |
| Tension of base fabric at the time of coating | N/m | 600 | 700 | 680 | 650 | 800 | 600 | 610 | 1400 | 700 | 1100 | 800 |
| Average resin thickness at vertex portion on surface of textile | μm | 11.3 | 7.3 | 7.1 | 8.4 | 10.8 | 10.4 | 8.9 | 3.8 | 5.2 | 10.6 | 8.4 |
| Weft strain amount/ Warp strain amount | — | 0.57 | 0.48 | 0.52 | 0.42 | 0.60 | 0.37 | 0.44 | 0.66 | 0.28 | 0.68 | 0.42 |
| Bending resistance (warp/weft) | mm | 59/67 | 64/72 | 67/76 | 69/79 | 70/75 | 66/78 | 66/81 | 68/74 | 64/79 | 71/76 | 62/84 |

TABLE 1-continued

| | | Example 1 | Example 2 | Example 3 | Example 4 | Example 5 | Example 6 | Example 7 | Comparative Example 1 | Comparative Example 2 | Comparative Example 3 | Example 8 |
|---|---|---|---|---|---|---|---|---|---|---|---|---|
| Difference in bending resistance | mm | 8 | 8 | 9 | 10 | 5 | 12 | 15 | 6 | 15 | 5 | 22 |
| Initial peel strength | N/cm | 51 | 50 | 51 | 51 | 53 | 57 | 55 | 43 | 49 | 51 | 47 |
| Initial cohesive failure | % | 100 | 100 | 100 | 100 | 100 | 100 | 100 | 100 | 95 | 100 | 100 |
| Peel strength after aging | N/cm | 65 | 63 | 64 | 63 | 65 | 65 | 67 | 55 | 57 | 59 | 57 |
| Cohesive failure rate after aging | % | 100 | 100 | 100 | 100 | 100 | 100 | 100 | 70 | 66 | 80 | 95 |

INDUSTRIAL APPLICABILITY

Since the coated fabric for an airbag of the present invention keeps the adhesiveness between the coating agent and the sealing agent even after long-term and high-temperature aging, it can provide a base fabric most suitable for a rollover curtain airbag using a sealing agent at a sewing part, and therefore the coated fabric largely contributes to industries.

DESCRIPTION OF REFERENCE SIGNS

1: Coating base fabric
2: Direction of weft cut plane
3: Direction of warp cut plane
4: Cross-section of weft
5: Vertex portion

The invention claimed is:

1. A coated fabric for an airbag, comprising a synthetic fiber textile and an addition-polymerized silicone resin on at least one surface of the synthetic fiber textile,
   wherein the coated fabric is obtained by a method including applying a silicone resin having a resin viscosity of 5000 to 40000 mPa·sec onto a synthetic fiber textile, while applying a tensile force of 400 to 1000 N/m in a traveling direction to the synthetic fiber textile; and
   wherein the coated fabric has a coating amount of the silicone resin of 24 to 45 g/m², an average resin thickness of warp and weft at a vertex portion on the surface of the coated fabric of 4 μm or more and 25 μm or less, and an average ratio of strain of the coated fabric in weft direction to strain of the coated fabric in warp direction of 0.30 to 0.65 as observed in stretching the coated fabric in the warp direction.

2. The coated fabric for an airbag according to claim 1, wherein an average resin thickness of warp and weft at a vertex portion on the surface of the coated fabric is 6 μm or more.

3. The coated fabric for an airbag according to claim 1, wherein a difference in the bending resistance between in warp direction and in weft direction of the coated fabric is 3 to 20 mm.

4. The coated fabric for an airbag according to claim 1, wherein a total fineness of a yarn constituting the textile is 200 to 550 dtex.

5. The coated fabric for an airbag according to claim 1, wherein a cover factor of the textile is 1800 to 2500.

6. The coated fabric for an airbag according to claim 2, wherein a difference in the bending resistance between in warp direction and in weft direction of the coated fabric is 3 to 20 mm.

7. The coated fabric for an airbag according to claim 2, wherein a total fineness of a yarn constituting the textile is 200 to 550 dtex.

8. The coated fabric for an airbag according to claim 3, wherein a total fineness of a yarn constituting the textile is 200 to 550 dtex.

9. The coated fabric for an airbag according to claim 6, wherein a total fineness of a yarn constituting the textile is 200 to 550 dtex.

10. The coated fabric for an airbag according to claim 2, wherein a cover factor of the textile is 1800 to 2500.

11. The coated fabric for an airbag according to claim 3, wherein a cover factor of the textile is 1800 to 2500.

12. The coated fabric for an airbag according to claim 4, wherein a cover factor of the textile is 1800 to 2500.

13. The coated fabric for an airbag according to claim 6, wherein a cover factor of the textile is 1800 to 2500.

14. The coated fabric for an airbag according to claim 7, wherein a cover factor of the textile is 1800 to 2500.

15. The coated fabric for an airbag according to claim 8, wherein a cover factor of the textile is 1800 to 2500.

16. The coated fabric for an airbag according to claim 9, wherein a cover factor of the textile is 1800 to 2500.

* * * * *